US009002103B2

(12) United States Patent
Saito

(10) Patent No.: US 9,002,103 B2
(45) Date of Patent: Apr. 7, 2015

(54) IMAGE PROCESSING APPARATUS AND COMPUTER READABLE MEDIUM

(75) Inventor: Teruka Saito, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 769 days.

(21) Appl. No.: 12/725,056

(22) Filed: Mar. 16, 2010

(65) Prior Publication Data

US 2011/0038533 A1 Feb. 17, 2011

(30) Foreign Application Priority Data

Aug. 17, 2009 (JP) .................................. 2009-188321

(51) Int. Cl.
G06K 9/00 (2006.01)
H04N 1/38 (2006.01)
G06T 1/00 (2006.01)

(52) U.S. Cl.
CPC ................ *H04N 1/38* (2013.01); *G06T 1/0028* (2013.01)

(58) Field of Classification Search
CPC ........ G06T 1/0028; H04N 1/38; H04N 1/387; B07C 3/14; G06K 9/209
USPC ......... 382/162, 165, 167, 163, 164, 168, 190, 382/260, 254, 255, 266; 358/447, 461, 358/518–523
See application file for complete search history.

(56) References Cited

U.S. PATENT DOCUMENTS 5,113,251 A * 5/1992 Ichiyanagi et al. ........... 358/500
5,132,786 A * 7/1992 Ishiwata ........................ 358/500
6,125,213 A 9/2000 Morimoto
6,532,020 B1 * 3/2003 Friedman et al. ............. 345/601
6,757,428 B1 * 6/2004 Lin et al. ....................... 382/165
6,760,125 B1 * 7/2004 Hayama ........................ 358/1.9
6,804,395 B1 10/2004 Yoshida
6,954,549 B2 * 10/2005 Kraft ............................. 382/167
7,266,250 B2 * 9/2007 Bloomberg et al. .......... 382/269
7,480,394 B2 * 1/2009 Berlin et al. .................. 382/101
7,864,198 B2 * 1/2011 Moroto et al. ................ 345/629

(Continued)

FOREIGN PATENT DOCUMENTS

| JP | 04335481 A | * 11/1992 | ............. G06F 15/70 |
|---|---|---|---|
| JP | A-10-228536 | 8/1998 | |
| JP | A-2000-350021 | 12/2000 | |
| JP | A-2005-217599 | 8/2005 | |
| JP | A-2005-316581 | 11/2005 | |
| JP | A-2006-262050 | 9/2006 | |

OTHER PUBLICATIONS

Notification of Reasons for Refusal dated Mar. 12, 2013 from Japanese Patent Application No. 2009-188321 (with English-language translation).

*Primary Examiner* — Mekonen Bekele
(74) *Attorney, Agent, or Firm* — Oliff PLC

(57) ABSTRACT

An image processing apparatus includes a definition reducing section, a color region extracting section, a concealing image generating section and an image combining section. The definition reducing section, based on a received image, generates an image having a lower definition than the received image. The color region extracting section extracts a color region from the low definition image generated by the definition reducing section. The concealing image generating section, based on the color region extracted by the color region extracting section, converts the color region into a concealing region for concealing a part of the received image and, generates a concealing image including the concealing region. The image combining section combines the received image with the concealing image generated by the concealing image generating section.

10 Claims, 10 Drawing Sheets

(56) References Cited

U.S. PATENT DOCUMENTS

| | | | |
|---|---|---|---|
| 2002/0141640 A1* | 10/2002 | Kraft | 382/167 |
| 2005/0041036 A1* | 2/2005 | Narayanaswami et al. | 345/605 |
| 2005/0135676 A1* | 6/2005 | Watanabe et al. | 382/162 |
| 2005/0180645 A1* | 8/2005 | Hasegawa et al. | 382/239 |
| 2006/0290957 A1* | 12/2006 | Kim et al. | 358/1.9 |
| 2007/0183679 A1* | 8/2007 | Moroto et al. | 382/254 |
| 2008/0137907 A1* | 6/2008 | Berlin et al. | 382/101 |
| 2010/0008533 A1* | 1/2010 | Saito | 382/100 |
| 2010/0008585 A1* | 1/2010 | Saito | 382/190 |
| 2010/0134410 A1* | 6/2010 | Tomisawa | 345/156 |

* cited by examiner

IMAGE PROCESSING APPARATUS AND COMPUTER READABLE MEDIUM

CROSS-REFERENCE TO RELATED APPLICATIONS

This application is based on and claims priority under 35 USC 119 from Japanese Patent Application No. 2009-188321 filed on Aug. 17, 2009.

BACKGROUND

1. Technical Field

The present invention relates to an image processing apparatus and a computer readable medium.

2. Related Art

Disclosure is often carried out for documents owned by administrative organizations and the like. Nevertheless, in some cases, these documents contain information that is required to be concealed in view of protection of personal information and the like. Thus, when these documents are to be disclosed, parts containing such information that is required to be concealed are blacked out or the like.

SUMMARY

According to an aspect of the invention, an image processing apparatus includes a definition reducing section, a color region extracting section, a concealing image generating section and an image combining section. The definition reducing section, based on a received image, generates an image having a lower definition than the received image. The color region extracting section extracts a color region from the low definition image generated by the definition reducing section. The concealing image generating section, based on the color region extracted by the color region extracting section, converts the color region into a concealing region for concealing a part of the received image and, generates a concealing image including the concealing region. The image combining section combines the received image with the concealing image generated by the concealing image generating section.

BRIEF DESCRIPTION OF THE DRAWINGS

Exemplary embodiment(s) of the present invention will be described in detail based on the following figures, wherein.

DETAILED DESCRIPTION

Exemplary embodiments for implementing the present invention are described below with reference to the drawings.

First Exemplary Embodiment

Figure 1:
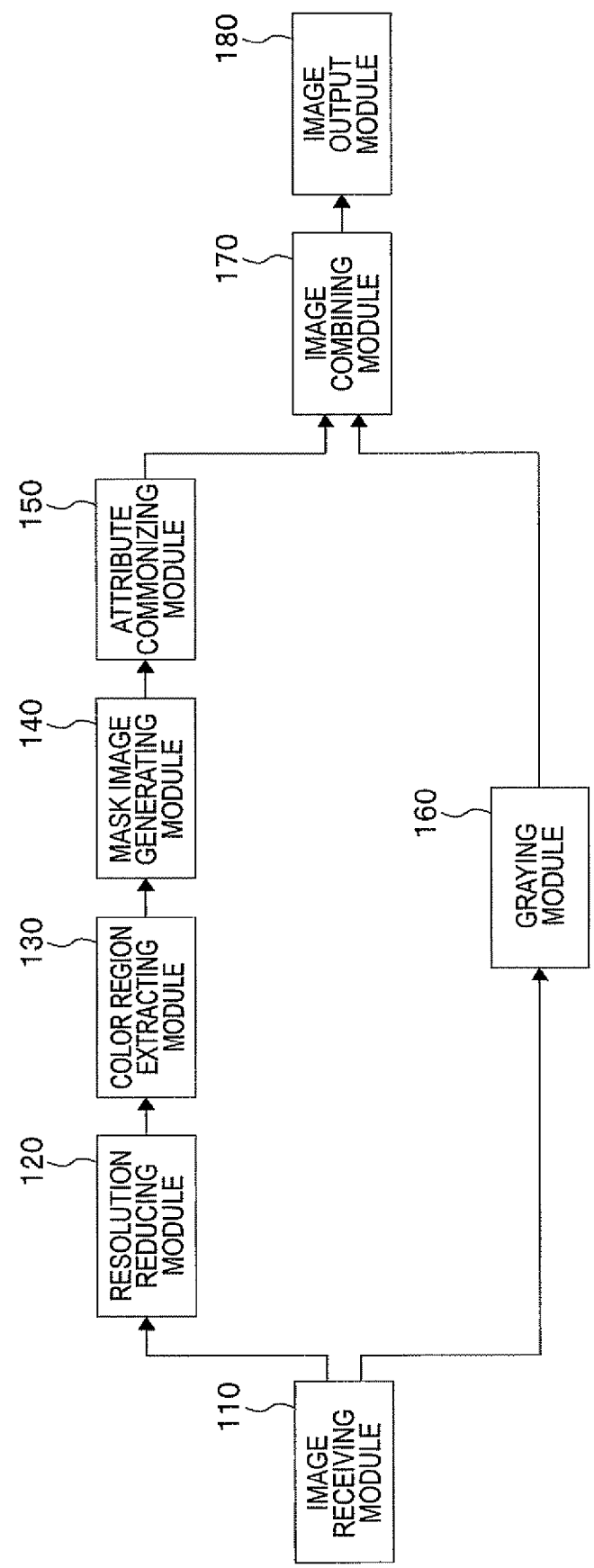
FIG. 1 is a conceptual module configuration diagram for an exemplary configuration according to a first exemplary embodiment.

FIG. 1 is a conceptual module configuration diagram for an exemplary configuration according to a first exemplary embodiment.

Here, the term "module" indicates a component of software (a computer program), hardware, or the like which is logically separable from other parts in general. Thus, a module in the present exemplary embodiment indicates not only a module in a computer program but also a module in a hardware configuration. Accordingly, the present exemplary embodiment serves also as descriptions of a computer program, a system, and a method. Here, for simplicity of description, the expressions "to store" and "to cause something to store" and other equivalent expressions are used. Then, in an exemplary embodiment of a computer program, these expressions indicate "to store into a storage device", "to perform control such as to cause to store into a storage device", and the like. Further, each module may be in one-to-one correspondence to a function. However, in actual implementation, one module may be constructed from a single program. Alternatively, a plurality of modules may be constructed from a single program. In contrast, a single module may be constructed from a plurality of programs. Further, a plurality of modules may be executed by a single computer. Alternatively, a single module may be executed by a plurality of computers in a distributed or parallel computing environment. Here, a module may contain another module. Further, in the following description, the term "connection" indicates a physical connection as well as a logical connection (data transfer, instructions, and reference relations between data, and the like).

Further, the terms "system" and "apparatus" indicate a configuration constructed by connecting a plurality of computers, hardware pieces, apparatuses, and the like through a communication such as a network (including a communication connection of one-to-one correspondence), as well as a configuration implemented by a single computer, hardware piece, apparatus, or the like. These terms "apparatus" and "system" are used as synonymous terms to each other. The expression "defined in advance" indicates that something is defined before a processing of interest. This includes timing before the start of the entire processing according to the present exemplary embodiment, as well as timing even after the start of processing according to the present exemplary embodiment as long as it is before the start of a particular processing piece of interest. That is, the expression indicates that something is defined in accordance with a situation or a state at that time, or alternatively in accordance with a situation and a state until that time.

The image processing apparatus according to the present exemplary embodiment processes an image having a region marked by a user, and based on the marked region, conceals (referred to as "to mask", in some cases hereinafter) the partial region of the image. As shown in the example of FIG. 1, the image processing apparatus has an image receiving module 110, a definition reducing module 120, a color region extracting module 130, a mask image generating module 140, an attribute commonizing module 150, a graying module 160, an image combining module 170, and an image output module 180.

The image receiving module 110 is connected to the definition reducing module 120 and the graying module 160. The image receiving module 110 receives an image and then transfers the image to the definition reducing module 120 and the graying module 160. The expression "to receive an image" indicates, for example, "to read an image through a scanner, a camera, or the like", "to receive an image from an external device through a facsimile or the like via a communication line", and "to read an image stored in a hard disk (one built in a computer or alternatively one connected via a network) or the like". The image is a multi-valued image serving as a color image. A single image or a plurality of images may be received. Further, the contents of the image are a document such as a report that is basically to be disclosed but contains a part to be made confidential. That is, the to-be-processed document is generated by a user marking a document, like painting or encircling a region to be concealed by using a color pen. This marking is performed with a color pen or the like of translucent color other than black. Thus, even when the ink is applied over black characters, the characters are seen clearly. This pen is of a kind called a marker pen, a highlighter pen, and the like. Here, such a part marked with a marker pen or the like is referred to as a marker region in some cases hereinafter. Further, the marking may be performed with a color pen of opaque color such as a red ball-point pen. In this case, characters remain clearly visible as long as the target characters are encircled rather than painted.

Here, the image receiving module 110 transfers the image to the definition reducing module 120 and the graying module 160. Then, the image transferred to the definition reducing module 120 is used for generating a mask image, while the image transferred to the graying module 160 is used for generating a clean copy of the original image in the part other than the marker region.

The definition reducing module 120 is connected to the image receiving module 110 and the color region extracting module 130. Based on an image received from the image receiving module 110, the definition reducing module 120 generates an image having a lower definition than the received image. Then, the low definition image is transferred to the color region extracting module 130. Employable methods of generating the image of low definition include: smoothing (such as feathering; more specifically, filtering such as equalization filtering and median filtering); the processing of reducing the definition (reduction processing); and the processing of performing irreversible compression at a high compression ratio and then performing enlargement.

The color region extracting module 130 is connected to the definition reducing module 120 and the mask image generating module 140. The color region extracting module 130 extracts a color region from a low definition image generated by the definition reducing module 120. Then, the extracted color region is transferred to the mask image generating module 140. The color region indicates a region marked as a to-be-masked region by a user. The extraction of a color region is performed by extracting pixels having saturation greater than or equal to a value determined in advance.

The mask image generating module 140 is connected to the color region extracting module 130 and the attribute commonizing module 150. Based on a color region extracted by the color region extracting module 130, the mask image generating module 140 convert a part of the image received by the image receiving module 110 into a mask region, and generates a mask image including the mask region. Then, the mask image is transferred to the attribute commonizing module 150. The conversion to the mask region is performed by converting the color region into black or the like. Alternatively, when the color region has a shape surrounding a region, the surrounded region including the color region itself is converted into black.

The attribute commonizing module 150 is connected to the mask image generating module 140 and the image combining module 170. For the purpose of combining the mask image generated by the mask image generating module 140 with the image processed by the graying module 160 (or the image received by the image receiving module 110), the attribute commonizing module 150 communizes the attribute of the image. Then, the commonized mask image is transferred to the image combining module 170. Here, the communization indicates the processing of changing the attribute of one image such as to be equal to the attribute of the other image. The attribute of the image to be commonized includes the resolution, the color mode (such as monochrome, gray, and color), and the like. That is, in a case that the definition reducing module 120 has reduced the resolution, the resolution and the like are restored in this processing.

The graying module 160 is connected to the image receiving module 110 and the image combining module 170, and generates a clean copy of the color image received from the image receiving module 110. Then, the image is transferred to the image combining module 170. The clean copy generation includes gray image generation. The gray image generation indicates conversion of a color image into a monochrome image including a gray image. That is, for example, the image may be converted into a YCrCb image, and then its Y component alone may be extracted so that an image may be generated. Further, the clean copy generation processing may be binarization other than the gray image generation, or alternatively null processing may be performed (that is, the graying module 160 may be omitted).

The image combining module 170 is connected to the attribute commonizing module 150, the graying module 160, and the image output module 180, and combines the mask image generated by the attribute commonizing module 150 with the image received by the image receiving module 110 (including the image obtained by clean copy generation in the graying module 160). Then, the obtained image is transferred to the image output module 180. The combination of images may be logical sum on a pixel basis, or alternatively may be conversion of the region of the received image corresponding to the black part of the mask image into white or the like.

The image output module 180 is connected to the image combining module 170, and receives an image generated by the image combining module 170 and then outputs the image. The expression "to output an image" includes "to print data through a printing apparatus such as a printer", "to display data onto a display apparatus such as a display device", "to transmit an image through an image transmitting apparatus such as a facsimile machine", "to write an image into an image storage device such as an image database", "to store data into a storage medium such as a memory card", and "to transfer data to another information processing apparatus".

Further, the image output module 180 may output data obtained by converting an image into document data in a PDF (Portable Document Format) or the like.

Figure 2:
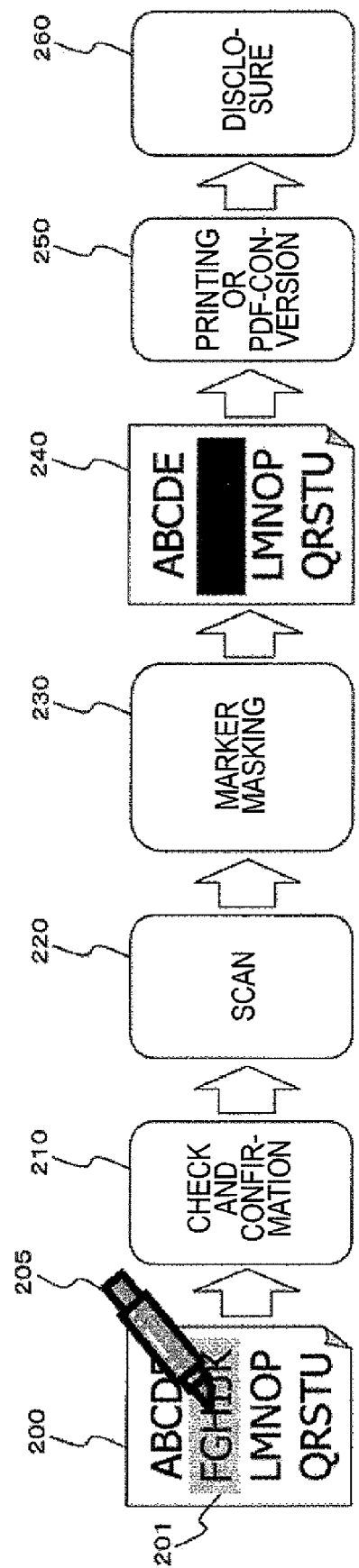
FIG. 2 is an explanation diagram showing an example of marker masking.

FIG. 2 is an explanation diagram showing an example of marker masking. This figure shows an example of masking in a practical situation in the present exemplary embodiment. Specifically, this example is a document to be under information disclosure but containing personal information and the like. Thus, such information need be concealed.

The document 200 is such an object document. Using a marker pen 205, a user paints a marker region 201 to be concealed. Here, the original document 200 before the marking is not in color, and is composed of black, white, and gray parts.

At check and confirmation 210, check and confirmation is performed by a person other than the user who marked the document 200. Since the ink color of the marker pen 205 is translucent, the check is allowed in a state that characters within the marker region 201 are visible.

At scan 220, the document 200 having undergone check and confirmation is read by a scanner. This read-out image is used in the present exemplary embodiment.

The present exemplary embodiment performs marker masking 230. As a result, a to-be-disclosed document 240 in which the marker region 201 is concealed is obtained. Then, the to-be-disclosed document 240 undergoes printing or PDF-conversion 250, and then goes into disclosure 260. Here, the concealed region in the to-be-disclosed document 240 is blacked out. Alternatively, the region may be converted into white (that is, characters and the like within the region may be deleted). Further, the painting may be performed in another color.

Figures 3A, 3B, 3C:
FIGS. 3A, 3B and 3C are explanation diagrams for showing an example of an image having undergone masking.

FIGS. 3A, 3B and 3C are explanation diagrams for showing an example of an image having undergone masking.

In the original image 300a illustrated in FIG. 3A, a marker region 310a is painted with a marker pen by a user. Here, the inside of the marker region 310a is, for example, in fluorescent yellow.

In the masking image 300b illustrated in FIG. 3B, the marker region 310a is changed into a black masking region 310b in the present exemplary embodiment.

In the masking image 300c illustrated in FIG. 3C, the marker region 310a is changed into a white masking region 310c in the present exemplary embodiment.

Figure 4A:
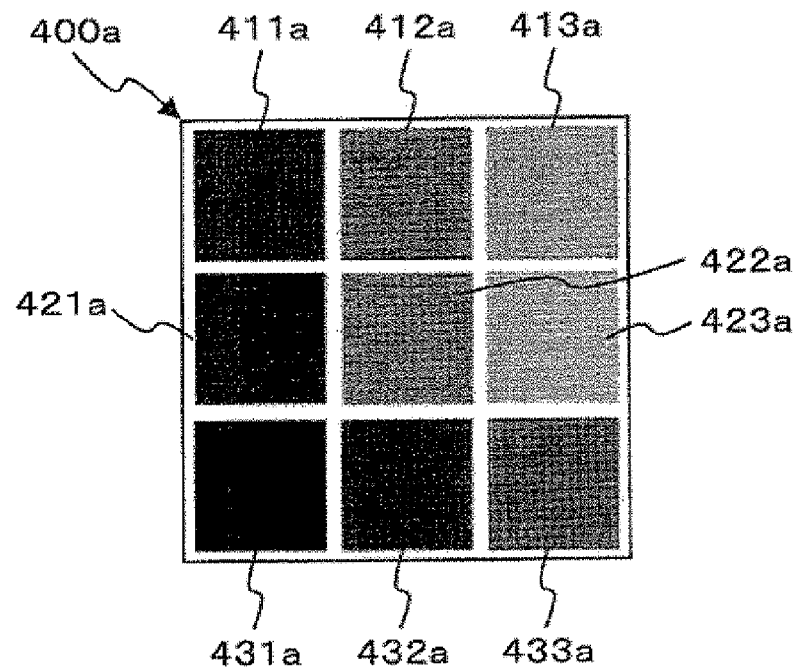
FIGS. 4A and 4B are explanation diagrams for showing an example of an image having undergone masking.
Figure 4B:
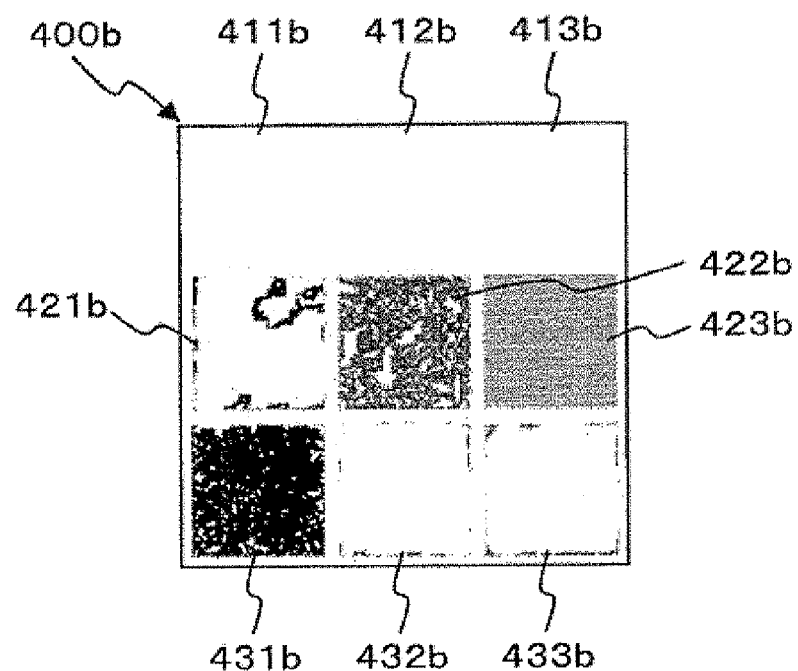

FIGS. 4A and 4B are explanation diagrams for showing an example of an image having undergone masking. In this example, a color region is simply extracted and then concealed without using the technique of the present exemplary embodiment.

In the original image 400a illustrated in FIG. 4A, the regions 411a, 412a, and 413a are marked parts, and hence are painted with a marker pen in three kinds of blue, respectively. In contrast, the regions 421a, 422a, 423a, 431a, 432a, and 433a are regions of original image, and are in gray of six kinds of densities, respectively.

When the processing of extracting a color region and then concealing the region (whitening the region, in this example) is performed on the original image 400a, a masking image 400b illustrated in FIG. 4B is obtained as a result.

That is, the entirety of the regions 411a, 412a, and 413a are extracted as color regions and concealed white. Nevertheless, despite that the region 421a and the like are original image parts and not color regions, these regions are whitened non-uniformly like the region 421b illustrated in FIG. 4B. This may be caused by sensitivity non-uniformly in the CCD (Charge Coupled Device) sensor, noise addition by irreversible compression, and the like. That is, despite that a part not painted with a marker pen is intrinsically in black, gray, and white, a color region is generated to a certain small extent. Then, such a region is also concealed, so that a patchy image is obtained as illustrated in FIG. 4B.

Figure 5:
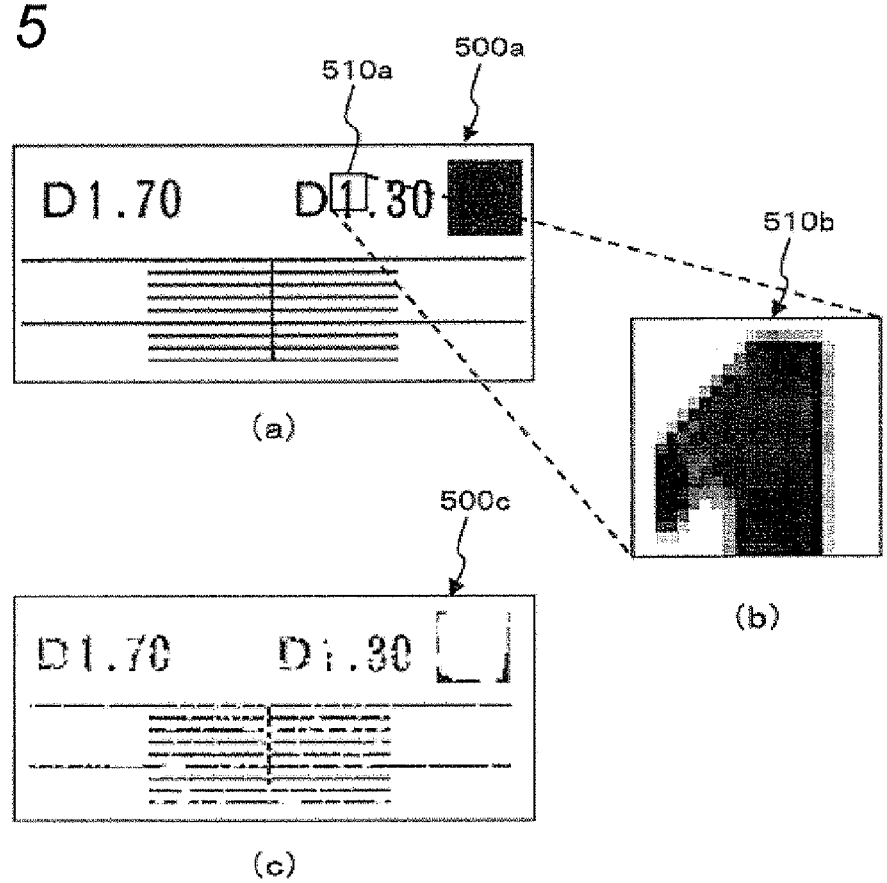
FIG. 5 is an explanation diagram showing an example of an image having undergone masking.

FIG. 5 is an explanation diagram showing an example of an image having undergone masking. Similarly to FIGS. 4A and 4B, in this example, a color region alone is extracted and then concealed without using the technique of the present exemplary embodiment.

The original image 500a illustrated in Part (a) of FIG. 5 is a document that contains characters and the like. Here, this example shows only a region in which painting with a marker pen is not performed.

The region 510b illustrated in Part (b) of FIG. 5 is enlargement of a part of the region 510a in the original image 500a of Part (a) of FIG. 5. As such, even when a character is intrinsically to be printed in uniform black, color other than black is generated by the above-mentioned reasons.

When the processing of extracting a color region and then concealing the region (whitening the region, in this example) is performed on the original image 500a, a masking image 500c illustrated in Part (c) of FIG. 5 is obtained as a result.

That is, in spite of the absence of a region painted with a marker pen, characters, lines, a black square, and the like are whitened in a patchy manner, and hence the image quality is degraded. Here, in this case that concealment is performed in white, the image quality is degraded. Nevertheless, even in a case that concealment is performed in black, concealment processing is performed also for a part where concealment processing is intrinsically unnecessary. This causes an increase in the processing time.

FIGS. 6A, 6B, 6C and 6D are explanation diagrams for showing an example of marker masking according to the first exemplary embodiment.

Figure 6A:
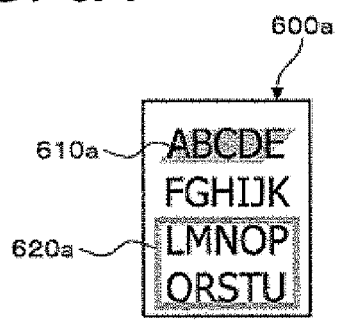
FIGS. 6A, 6B, 6C and 6D are explanation diagrams for showing an example of marker masking according to a first exemplary embodiment.

The image receiving module 110 receives the original image 600a illustrated in FIG. 6A. In the original image 600a, a marker region 610a (painted) and a marker region 620a (encircled) are specified as parts to be concealed by a user with the marker pen 205. Here, the marker regions 610a and 620a are in translucent blue.

Figure 6B:
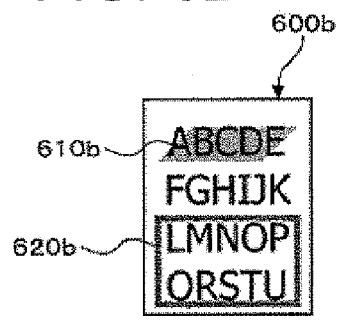

The graying module 160 converts the original image 600a into a graying-processed image 600b illustrated in FIG. 6B. The graying-processed image 600b has a marker region 610b and a marker region 620b whose color has been changed into gray.

Figure 6C:
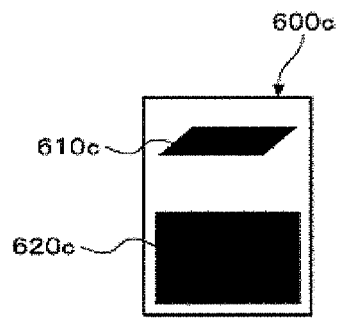

From the marker regions 610a and 620a which are color regions extracted by the color region extracting module 130, the mask image generating module 140 generates a mask image 600c illustrated in FIG. 6C. That is, from the marker region 610a, a masking region 610c where translucent blue has been converted into black is generated. Further, from the marker region 620a, a masking region 620c where a region surrounded by a translucent blue line has been converted into black is generated. After that, the attribute commonizing module 150 commonizes the attribute (resolution and the like) of the mask image 600c such that combination with the graying-processed image 600b is allowed. Then, the image combining module 170 combines the images 600b and 600c into an image 600d shown in FIG. 6D.

Figure 6D:
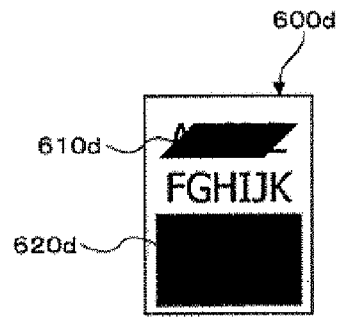

The image output module 180 outputs the masking image 600d illustrated in FIG. 6D. In this image, the masking regions 610d and 620d are masked by the corresponding marker regions 610a and 620a.

Figure 7A:
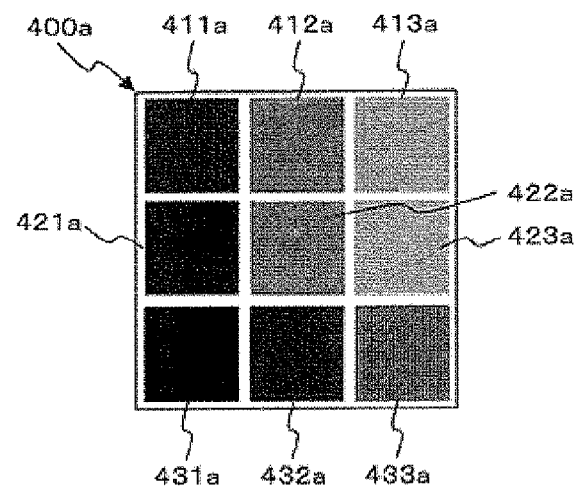
FIGS. 7A, 7B, 7C are explanation diagrams for showing an example of an image having undergone masking according to a first exemplary embodiment.
Figure 7B:
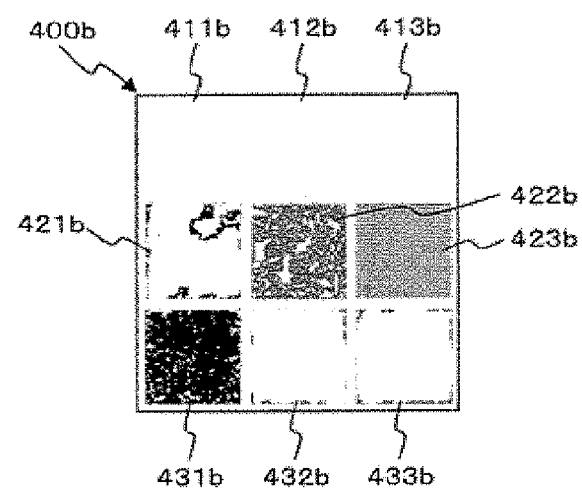
Figure 7C:
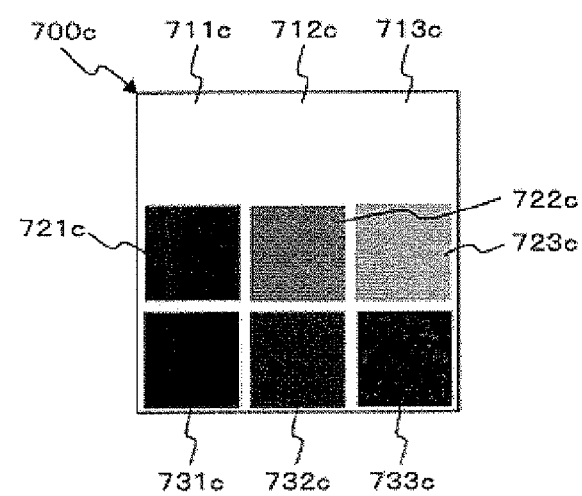

FIGS. 7A, 7B and 7C are explanation diagrams for showing an example of an image having undergone masking according to the first exemplary embodiment. FIGS. 7A and 7B correspond to FIGS. 4A and 4B, respectively. The result of processing of the present exemplary embodiment performed on the original image 400a illustrated in FIG. 7A is the masking image 700c illustrated in FIG. 7C. That is, if masking were simply performed on a color region, a patchy image would be obtained even in regions not pained out with a marker pen like in the masking image 400b illustrated in FIG. 7B. In contrast, in the processing according to the present exemplary embodiment, the regions 411a, 412a, and 413a painted with a marker pen are masked like the regions 711c, 712c, and 713c. Further, the regions 421a, 422a, 423a, 431a, 432a, and 433a of the original image part remain intact like the regions 721c, 722c, 723c, 731c, 732c, and 733c.

Second Exemplary Embodiment

Figure 8:
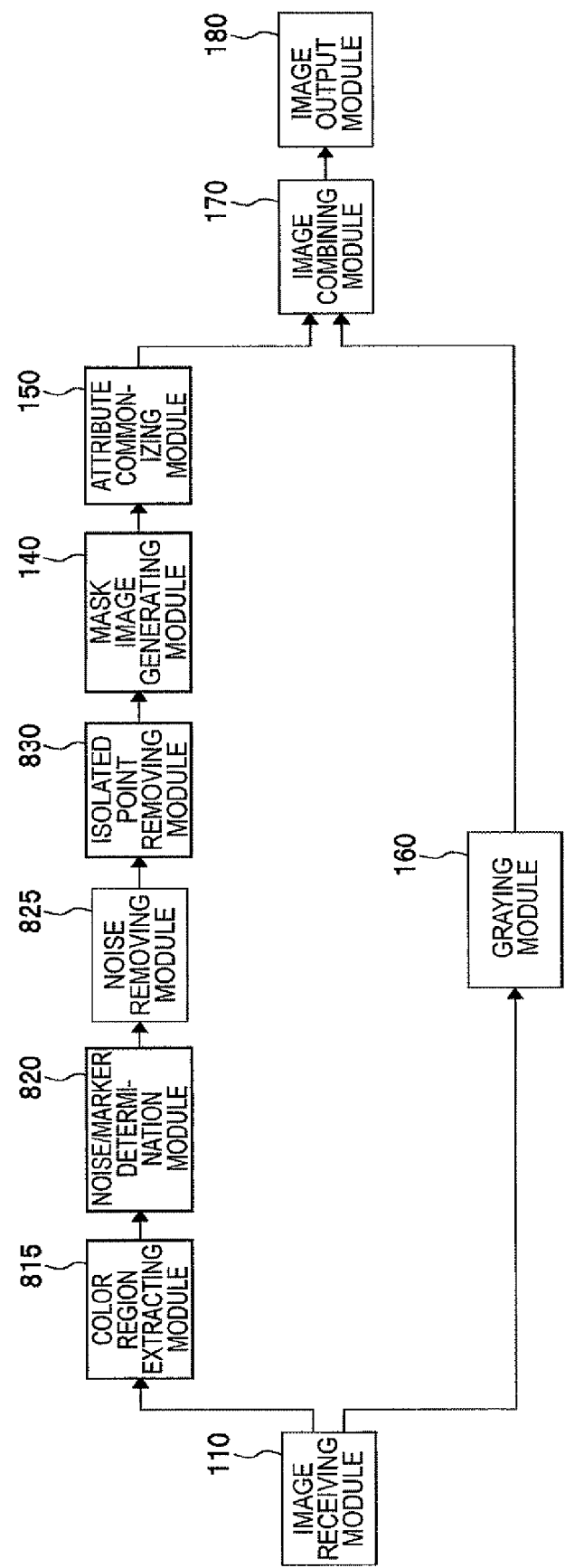
FIG. 8 is a conceptual module configuration diagram for an exemplary configuration according to a second exemplary embodiment.

FIG. 8 is a conceptual module configuration diagram for an exemplary configuration according to a second exemplary embodiment. Here, like modules to those in the first exemplary embodiment are designated by like numerals, and hence duplicated description is omitted. Further, even though designated by the same numerals, the modules described below add operation and functions to those in the first exemplary embodiment, or alternatively replace their operation and functions.

As shown in the example of FIG. 8, the second exemplary embodiment comprises: an image receiving module 110, a color region extracting module 815, a noise/marker determination module 820, a noise removing module 825, an isolated point removing module 830, a mask image generating module 140, an attribute communizing module 150, a graying module 160, an image combining module 170, and an image output module 180.

The image receiving module 110 is connected to the color region extracting module 815 and the graying module 160, and transfers a received image to the color region extracting module 815 and the graying module 160. The image transferred to the color region extracting module 815 is used for generating a masking image. The image transferred to the graying module 160 is used for generating a clean copy of the original image in the part other than the marker region.

The color region extracting module 815 is connected to the image receiving module 110 and the noise/marker determination module 820, and extracts a color region from an image received by the image receiving module 110. Then, the extracted color region is transmitted to the noise/marker determination module 820. The color region indicates a region marked as a to-be-masked region by a user. The extraction of a color region is performed by extracting pixels having saturation greater than or equal to a value determined in advance. At this stage, in some cases, regions other than a region marked by a marker pen or the like are extracted also as color regions.

The noise/marker determination module 820 is connected to the color region extracting module 815 and the noise removing module 825. Then, based on the lightness of the color region extracted by the color region extracting module 815, the lightness of the peripheral region of the color region extracted by the color region extracting module 815, or the hue of the color region extracted by the color region extracting module 815, the noise/marker determination module 820 determines whether the color region is to be adopted as a mask region for masking a part of the image. Then, the determination result is transferred to the noise removing module 825. The lightness of a region is calculated from the lightness values of the pixels within the region, and is expressed by the average, the mode, or the like of the lightness values of the pixels. Here, an employable method of determination is that based on comparison with a value defined in advance. In the comparison between the lightness and the value defined in advance, it is sufficient that a dark one is determined as not a masking region. In a case that the determination is performed based on the hue of the color region, the determination may be, for example, based on comparison between a deviation (variation) in the hue within the color region and a value defined in advance. This is because an intrinsic marker region is of single color whereas a region that is a color region but not a marker region is frequently of plural color.

Further, in a case that the noise/marker determination module 820 performs determination based on the lightness of the peripheral region of the color region, the determination may be based on comparison between the lightness and a value corresponding to the resolution of the received image or a pixel group in the peripheral region. This is because in a case that a pixel group such as characters is marked with a marker pen or the like, a possibility arises that the region is determined as not a masking region in the above-mentioned determination. Thus, the above-mentioned comparison is employed for avoiding such determination. That is, the peripheral region is generated by expanding the color region by the number of pixels defined in advance. At the time, in order that the actual size of the peripheral region should not vary, the number of pixels for expansion is adjusted in accordance with the resolution. Further, the size and the density of the pixel group are measured so that the influence of characters mixed into the peripheral region is predicted in advance. Then, from the peripheral region, pixels of low lightness such as characters are removed by a number define in advance. After that, the lightness may be calculated from the background and the marker region having been remained. Alternatively, pixels of a lightness lower than or equal to a threshold value defined in advance may be extracted in each peripheral region, and then the entire lightness may be calculated after the pixels are removed.

Further, the noise/marker determination module 820 may perform determination based on a combination of any two or more of the lightness of the color region, the lightness of the peripheral region of the color region, and the hue of the color region.

Figure 9:
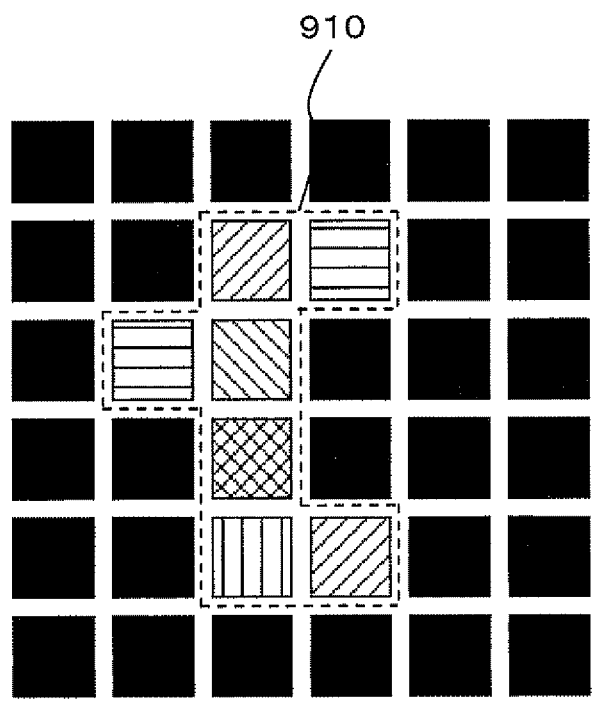
FIG. 9 is an explanation diagram showing an example of a region that has been determined as a color region but that is not a masking region.

FIG. 9 is an explanation diagram showing an example of a region that has been determined as a color region but that is not a masking region. Each square shown in FIG. 9 indicates a pixel. The region 910 surrounded by black pixels is an example of a region that is not a marker region but that has been extracted as a color region. Even in a case that all pixels are intrinsically black, in some cases, the pixels become colored like this owing to the sensitivity non-uniformly in the sensor or the like. The lightness of the pixels in the region 910 is dark because these pixels are intrinsically black ones. Thus, the noise/marker determination module 820 determines that pixels darker than a value defined in advance do not constitute a masking region. Further, a region marked with a marker pen or the like is of white region in many cases, and a darker region is frequently extracted as a color region. Thus, when the pixels in the peripheral region of the region 910 are darker than a value defined in advance, it is determined that the region 910 is not a masking region.

Figure 10:
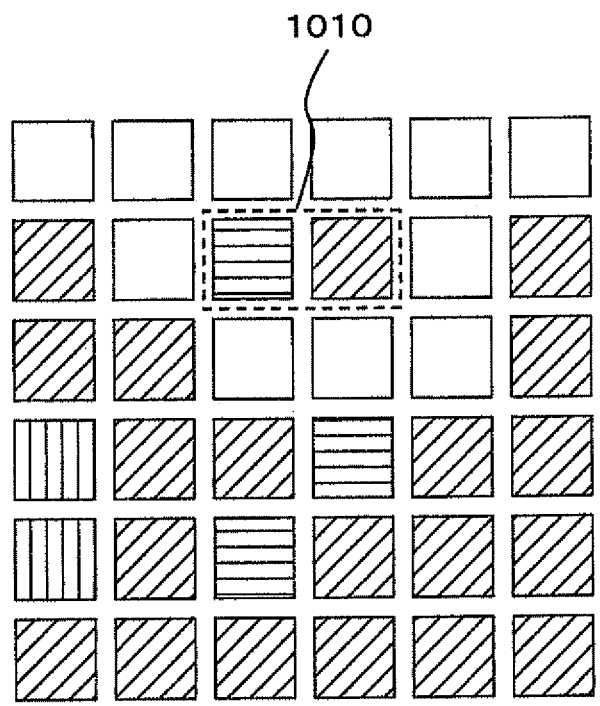
FIG. 10 is an explanation diagram showing an example of pixels to be determined as a masking region.

FIG. 10 is an explanation diagram showing an example of pixels to be determined as a masking region. Each square shown in FIG. 10 indicates a pixel. The region 1010 surrounded by white pixels is an example of a region extracted as a color region. The region 1010 intrinsically belongs to the surrounding color region, but is separated like this owing to irreversible compression and the like. The lightness of the pixels in the region 1010 is bright because the ink color of the marker pen or the like is translucent and the intrinsic color of the background is white. Thus, the noise/marker determination module 820 determines that pixels brighter than a value defined in advance constitute a masking region. Further, a region marked with a marker pen or the like is of white region in many cases. Thus, when the pixels in the peripheral region of the region 1010 are brighter than a value defined in advance, it is determined that the region 1010 is a masking region.

The noise removing module 825 is connected to the noise/marker determination module 820 and the isolated point removing module 830, and removes a region (color region determined that it should not consider as the mask image) determined as a noise by the noise/marker determination module 820. That is, marker regions alone are maintained. Then, each marker region is transferred to the isolated point removing module 830.

The isolated point removing module 830 is connected to the noise removing module 825 and the mask image generating module 140, and removes isolated points from the color region determined to be adopted as a mask image by the noise/marker determination module 820 (that is, the color region where noises have been removed by the noise removing module 825). Then, the marker region where isolated points have been removed is transferred to the mask image generating module 140. In this processing, when coloring occurs on a black character or a line, in a case that the noise/marker determination module 820 performs determination based on the hue, no variation in the hue arises in some cases if the extracted color region is small. Further, also in a case that the determination is based on the surrounding lightness, no distinction arises from a situation that the marker is drawn on a character. Thus, even a color region is determined to be adopted as a mask region, in some cases, the region is not an appropriate marker region. Thus, the above-mentioned processing is employed in order to remove such small regions (isolated points). Accordingly, when the noise/marker determination module 820 performs determination based on the lightness of a color region, the processing performed by the isolated point removing module 830 may be omitted. Here, the isolated point indicates a color region having an area smaller than or equal to a value defined in advance.

The mask image generating module 140 is connected to the isolated point removing module 830 and the attribute commonizing module 150. The mask image generating module 140 converts the color region determined to be adopted as a mask region by the noise/marker determination module 820 into a mask region, and generates the mask image including the mask region. Alternatively, the mask image generating module 140 converts the color region where isolated points have been removed by the isolated point removing module 830 into a mask region, and generates a mask image including the mask region.

Third Exemplary Embodiment

Figure 11:
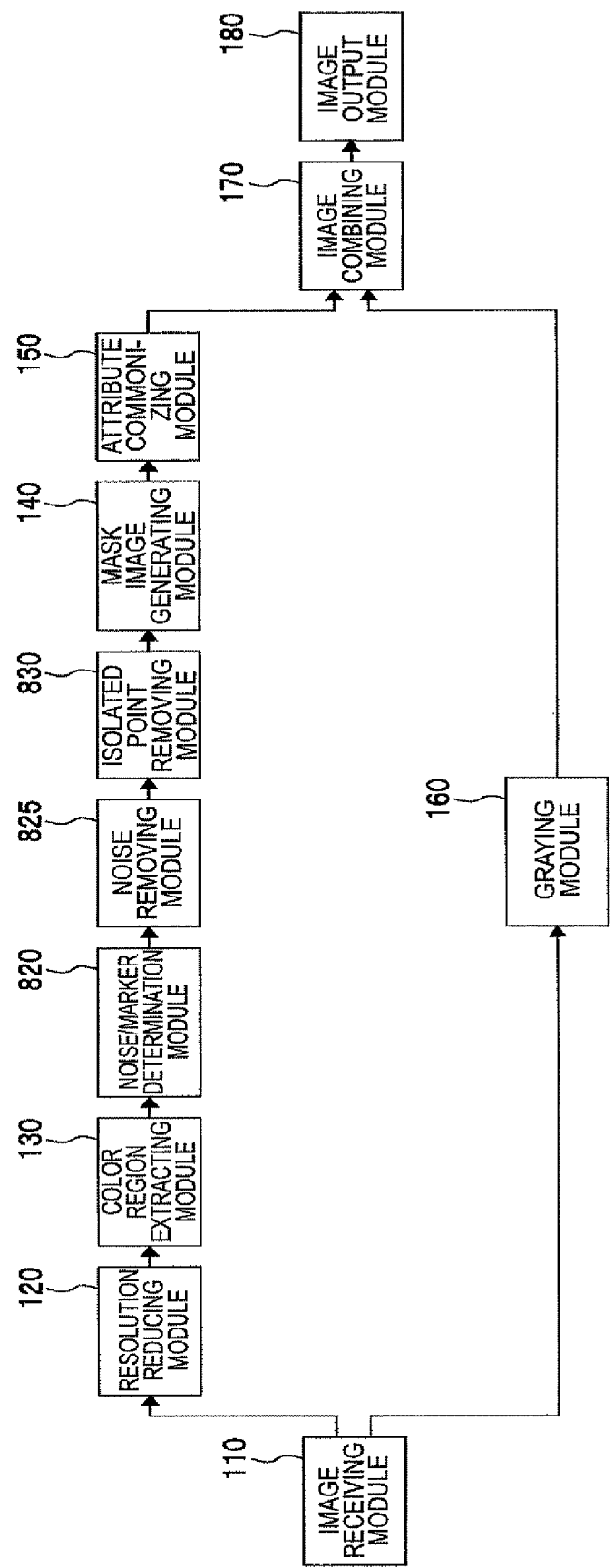
FIG. 11 is a conceptual module configuration diagram for an exemplary configuration according to a third exemplary embodiment.

FIG. 11 is a conceptual module configuration diagram for an exemplary configuration according to a third exemplary embodiment. The third exemplary embodiment is a combination of the first exemplary embodiment and the second exemplary embodiment. Here, like modules to those in the first and the second exemplary embodiments are designated by like numerals, and hence duplicated description is omitted. Further, even though designated by the same numerals, the modules described below add operation and functions to those in the first and the second exemplary embodiments, or alternatively replace their operation and functions.

As shown in the example of FIG. 11, the third exemplary embodiment includes: an image receiving module 110, a definition reducing module 120, a color region extracting module 130, a noise/marker determination module 820, a noise removing module 825, an isolated point removing module 830, a mask image generating module 140, an attribute commonizing module 150, a graying module 160, an image combining module 170, and an image output module 180.

The color region extracting module 130 is connected to the definition reducing module 120 and the noise/marker determination module 820. The color region extracting module 130 extracts a color region from a low definition image generated by the definition reducing module 120. Then, the extracted color region is transmitted to the noise/marker determination module 820.

The noise/marker determination module 820 is connected to the color region extracting module 130 and the noise removing module 825. Then, based on the lightness of the color region extracted by the color region extracting module 130, the lightness of the peripheral region of the color region extracted by the color region extracting module 130, or the hue of the color region extracted by the color region extracting module 130, the noise/marker determination module 820 determines whether the color region is to be adopted as a mask region for masking a part of the image.

Figure 12:
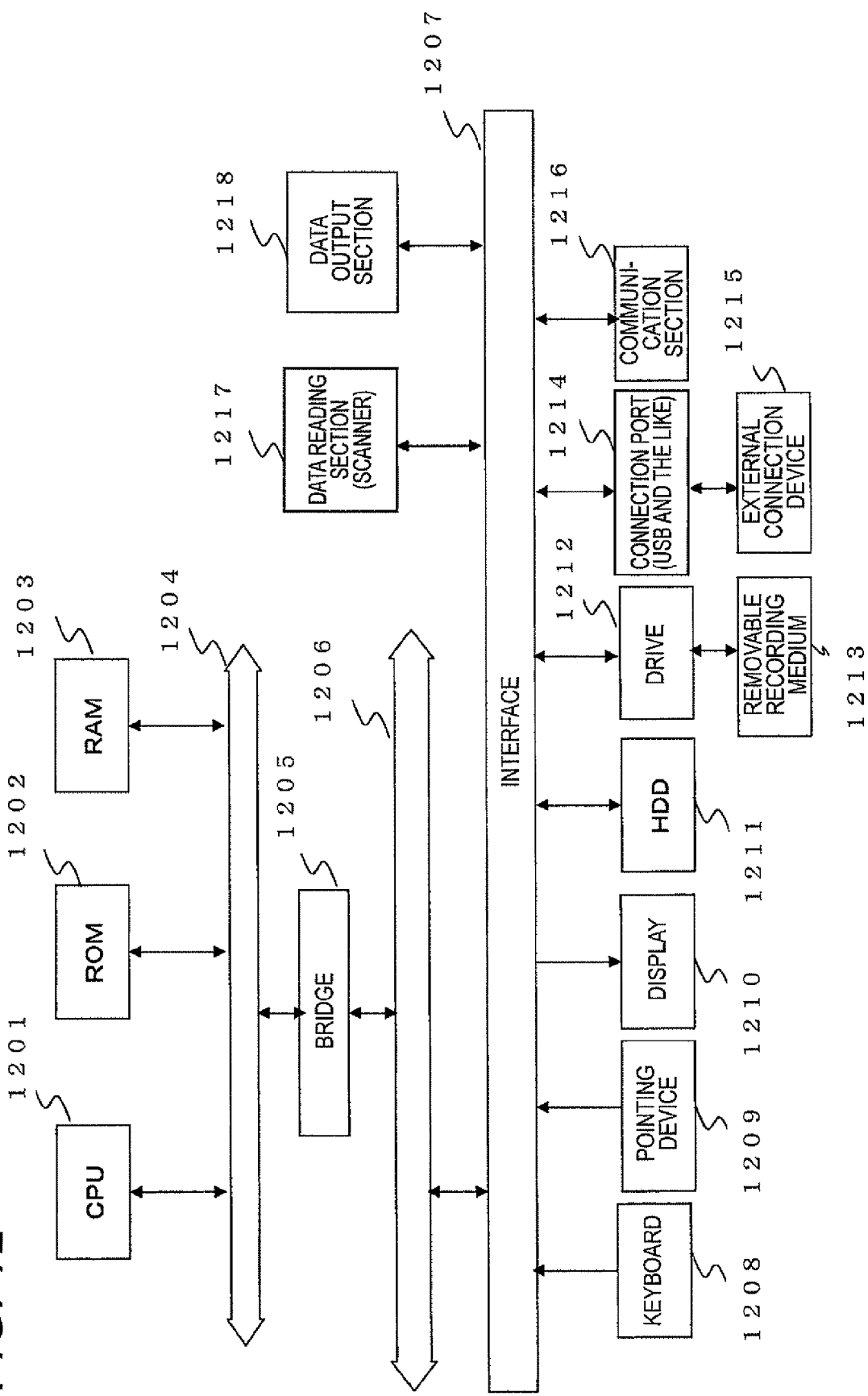
FIG. 12 is a configuration diagram showing an example of a hardware configuration of a computer for implementing first to third exemplary embodiments.

An example of hardware configuration of the image processing apparatus of the above-mentioned exemplary embodiment is described below with reference to FIG. 12. The configuration shown in FIG. 12 is constructed from a personal computer (PC) or the like. This hardware configuration has: a data reading section 1217 such as a scanner; and a data output section 1218 such as a printer.

The CPU (Central Processing Unit) 1201 is a control section for executing the processing according to a computer program that describes the execution sequence of the various kinds of modules described in the above-mentioned exemplary embodiments, that is, the definition reducing module 120, the color region extracting module 130, the color region extracting module 130, the mask image generating module 140, the attribute commonizing module 150, the graying module 160, the image combining module 170, the color region extracting module 815, the noise/marker determination module 820, the noise removing module 825, the isolated point removing module 830, and the like.

The ROM (Read Only Memory) 1202 stores programs, calculation parameters, and the like used by the CPU 1201. The RAM (Random Access Memory) 1203 stores: programs used in the execution by the CPU 1201; parameters that vary in accordance with the execution; and the like. These units are connected to each other through a host bus 1204 constructed from a CPU bus and the like.

The host bus 1204 is connected through the bridge 1205 to the external bus 1206 such as a PCI (Peripheral Component Interconnect/Interface) bus.

The keyboard 1208 and the pointing device 1209 such as a mouse are input devices operated by an operator. The display 1210 is constructed from a liquid crystal display or a CRT (Cathode Ray Tube), and displays various kinds of information in the form of a text and image information.

The HOD (Hard Disk Drive) 1211 has a hard disk in the inside, and drives the hard disk so as to record or reproduce programs and information executed by the CPU 1201. The hard disk stores images, mask images, and the like having been received. Further, various kinds of computer programs, like various kinds of data processing programs other than those described above, are stored.

The drive 1212 reads out data or a program recorded on the presently-attached removable recording medium 1213 such as a magnetic disk, an optical disk, a magneto-optical disk, and a semiconductor memory. Then, the data or the program is provided to the RAM 1203 connected through the interface 1207, the external bus 1206, the bridge 1205, and the host bus 1204. The removable recording medium 1213 may be used also as a data recording region similarly to the hard disk.

The connection port 1214 is a port to which an external connection device 1215 is connected, and has connection sections of USB, IEEE 1394, and the like. The connection port 1214 is connected to the CPU 1201 and the like through the interface 1207, the external bus 1206, the bridge 1205, the host bus 1204, and the like. The communication section 1216 is connected to the network, and executes data communication with the outside. The data reading section 1217 is constructed from a scanner or the like, and executes document reading. The data output section 1218 is constructed from a printer or the like, and executes document data output.

Here, the hardware configuration of the image processing apparatus shown in FIG. 12 is illustrative. Thus, the above-mentioned exemplary embodiment is not limited to the configuration shown in FIG. 12, and may be another one as long as the modules described in the above-mentioned exemplary embodiment are implemented. For example, a part of the modules may be constructed from dedicated hardware (such as an application specific integrated circuit (ASIC)). Alternatively, a mode may be employed that a part of the modules are located in an external system and connected through a communication line. Further, a plurality of systems like that shown in FIG. 12 may be connected to each other through a communication line, and operate in a cooperative manner. Furthermore, the present configuration may be incorporated in a copying machine, a facsimile machine, a scanner, a printer, a combined machine (an image processing apparatus having any two or more functions of a scanner, a printer, a copying machine, a facsimile machine, and the like), or the like.

Here, various kinds of the above-mentioned exemplary embodiments may be combined (for example, a module in an exemplary embodiment may be incorporated into another exemplary embodiment, or may replace a module in an exemplary embodiment). Alternatively, a technique described in the section of background art may be employed as the contents of processing of a module.

Further, in the description of the exemplary embodiments, in the comparison with a value defined in advance, the expressions "greater than or equal to", "smaller (lower) than or equal to", "greater than", and "smaller (lower) than" may be replaced by "greater than", "smaller (lower) than", "greater than or equal to", and "smaller (lower) than or equal to", as long as conflict does not arise in the combination. Further, the value defined in advance in each determination may be independent of each other. Thus, these values may be different from each other, or alternatively may be the same.

Here, the programs described above may be provided in the form of being stored in a recording medium. Further, the programs may be provided through a communication. In this case, for example, each program described above may be regarded as an invention in a "computer-readable recording medium that carries a program".

A "computer-readable recording medium that carries a program" indicates a computer-readable recording medium that carries a program and is used for installation and execution of a program, circulation of a program, or the like.

Here, employable recording media include: a digital versatile disk (DVD) such as a DVD-R, a DVD-RW, and a DVD-RAM according to the standard set forth by the DVD Forum; a DVD+R, a DVD+RW, and the like set forth by DVD+RW; compact disks (CDs) such as a read-only memory (CD-ROM), a CD recordable (CD-R), and a CD rewritable (CD-RW); a Blu-ray Disc (registered trademark); a magneto-optical disk (MO); a flexible disk (FD); a magnetic tape; a hard disk; a read-only memory (ROM); an electrically erasable and programmable read only memory (EEPROM); a flash memory; and a random access memory (RAM).

Further, the programs described above or a part of them may be saved or circulated in the form of being recorded on the recording medium. Furthermore, the programs may be transmitted by communication through a transmission medium like a wired network, a wireless communication network, or a combination of these which is used in a local area network (LAN), a metropolitan area network (MAN), a wide area network (WAN), the Internet, an intranet, an extranet, or the like. Further, the programs may be transmitted on carrier waves.

Further, each program described above may be a part of another program, or alternatively may be recorded on a recording medium together with other programs. Further, each program may be divided and recorded on a plurality of recording media. Furthermore, any recording mode such as compression and encryption may be employed as long as reproduction is available.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
   a definition reducing section that is configured to generate a low definition image having a lower definition than a received image, based on the received image;
   a color region extracting section that is configured to extract a color region from the low definition image generated by the definition reducing section by extracting pixels of the low definition image which have saturation greater than or equal to a value greater than zero, the color region corresponding to a region marked as a to-be-masked region;
   a concealing image generating section that is configured to:
   i) convert the color region into a concealing region for concealing a part of the received image, and
   ii) generate a concealing image including the concealing region, the concealing image reducing a visibility of an original content of the part of the received image, and being different from the color region,
   wherein the concealing image generating section is configured to generate the concealing image based on the color region extracted by the color region extracting section;
   a graying image generating section that performs gray image generation of the received image and generated a grayed image; and
   an image combining section that is configured to superimpose the concealing image on a part of the grayed image, the part including information to be concealed, to generate a single image of the concealing image and the grayed image.

2. An image processing apparatus comprising:
a color region extracting section that is configured to extract a color region from a received image by extracting pixels of a low definition image which have saturation greater than or equal to a value greater than zero, the color region corresponding to a region marked as a to-be-masked region;
a determination section that is configured to determine whether the color region is to be adopted as a concealing region for concealing a part of the received image, based on at least one of:
  i) a lightness of the color region extracted by the color region extracting section,
  ii) a lightness of a peripheral region of the color region extracted by the color region extracting section, and
  iii) a hue of the color region extracted by the color region extracting section,
a concealing image generating section that is configured to:
  i) convert the color region determined to be adopted as the concealing region by the determination section into the concealing region, and ii) generate a concealing image including the concealing region, the concealing image reducing a visibility of an original content of a part of the received image, and being different from the color region;
a graying image generating section that performs gray image generation of the received image and generates a grayed image; and
an image combining section that is configured to superimpose the concealing image on a part of the grayed image, the part including information to be concealed, to generate a single image of the concealing image and the grayed image, wherein
  the concealing image generating section is configured to generate the concealing image based on the low definition image having a lower definition than the received image.

3. The image processing apparatus according to claim 1, further comprising:
a determination section that is configured to determine whether the color region is to be adopted as the concealing region for concealing the part of the received image, based on:
  i) a lightness of the color region extracted by the color region extracting section,
  ii) a lightness of a peripheral region of the color region extracted by the color region extracting section, or
  iii) a hue of the color region extracted by the color region extracting section, wherein
    the concealing image generating section is configured to: i) convert the color region determined to be adopted as the concealing region by the determination section into the concealing region, and ii) generate the concealing image including the concealing region.

4. The image processing apparatus according to claim 2, wherein, when the determination section performs the determination based on the lightness of a peripheral region of the color region, the determination is performed based on a comparison between the lightness and a resolution of the received image or a value obtained based on a pixel group in the peripheral region of the color region.

5. The image processing apparatus according to claim 2, further comprising:
an isolated point removing section that is configured to remove isolated points from the color region determined to be adopted as the concealing region by the determination section, wherein
  the concealing image generating section is configured to: i) convert the color region where the isolated points have been removed by the isolated point removing section from the concealing region, and ii) generate the concealing image including the concealing region.

6. A non-transitory computer readable medium storing a program causing a computer to execute a process for image processing, the process comprising:
generating a low definition image having a lower definition than a received image, based on the received image;
extracting a color region from the low definition image by extracting pixels of the low definition image which have saturation greater than or equal to a value greater than zero, the color region corresponding to a region marked as a to-be-masked region;
converting the color region into a concealing region for concealing a part of the received image, based on the color region;
generating a concealing image including the concealing region, the concealing image reducing a visibility of an original content of the part of the received image, and being different from the color region;
performing gray image generation of the received image so as to generate a grayed image; and
superimposing the concealing image on a part of the grayed image, the part including information to be concealed, to generate a single image of the concealing image and the grayed image.

7. A non-transitory computer readable medium storing a program causing a computer to execute a process for image processing, the process comprising:
extracting a color region from a received image by extracting pixels of a low definition image which have saturation greater than or equal to a value greater than zero, the color region corresponding to a region marked as a to-be-masked region;
determining whether the color region is to be adopted as a concealing region for concealing a part of the received image, based on at least one of: i) a lightness of the color region, ii) a lightness of a peripheral region of the color region, and iii) a hue of the color region;
converting the color region determined to be adopted as the concealing region into the concealing region;
generating a concealing image including the concealing region, the concealing image reducing a visibility of an original content of a part of the received image, and being different from the color region;
performing gray image generation of the received image so as to generate a grayed image; and
superimposing the concealing image on a part of the grayed image, the part including information to be concealed, to generate a single image of the concealing image and the grayed image, wherein
  the concealing image is generated based on the low definition image having a lower definition than the received image.

8. The image processing apparatus according to claim 1, wherein the concealing image generating section is configured to exclude any image data that is not part of the concealing region.

9. The image processing apparatus according to claim 1, wherein the color region extracted by the color region extracting section is caused by markings of a color pen.

10. The image processing apparatus according to claim 4, wherein
  the determination section is configured to determine that the color region is not adopted as the concealing region when the lightness of the pixel group of the peripheral region is smaller than a predefined value, and
  the determination section is configured to determine that the color region is adopted as the concealing part when the lightness of the pixel group of the peripheral region is larger than the predefined value.

\* \* \* \* \*